US008914478B2

(12) United States Patent
Acuna et al.

(10) Patent No.: US 8,914,478 B2
(45) Date of Patent: Dec. 16, 2014

(54) AUTOMATED DEPLOYMENT OF SOFTWARE FOR MANAGED HARDWARE IN A STORAGE AREA NETWORK

(75) Inventors: Jorge D. Acuna, Tucson, AZ (US); Ezequiel Cervantes, Tucson, AZ (US); Nedzad Taljanovic, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 13/111,757

(22) Filed: May 19, 2011

(65) Prior Publication Data

US 2012/0297039 A1 Nov. 22, 2012

(51) Int. Cl.
*G06F 15/177* (2006.01)
*G06F 3/06* (2006.01)
*G06F 9/445* (2006.01)
*H04L 29/08* (2006.01)

(52) U.S. Cl.
CPC *G06F 3/067* (2013.01); *G06F 8/61* (2013.01); *H04L 67/1097* (2013.01)
USPC .......................................... 709/220; 717/171

(58) Field of Classification Search
CPC ....... H04L 41/08; H04L 67/1097; G06F 8/60; G06F 8/70; G06F 8/61
USPC ......... 709/223, 224, 220, 221, 217, 211, 209, 709/208, 225, 226, 227; 711/203; 717/170, 717/171
See application file for complete search history.

(56) References Cited

U.S. PATENT DOCUMENTS

| | | | |
|---|---|---|---|
| 6,658,469 B1 * | 12/2003 | Massa et al. | 709/224 |
| 6,952,698 B2 * | 10/2005 | Delaire et al. | 1/1 |
| 7,275,098 B1 * | 9/2007 | Becher et al. | 709/223 |
| 7,512,595 B1 * | 3/2009 | McBride et al. | 1/1 |
| 7,526,620 B1 * | 4/2009 | McGovern | 711/159 |
| 7,587,495 B2 * | 9/2009 | Albouze et al. | 709/227 |
| 7,606,986 B1 * | 10/2009 | Limaye et al. | 711/153 |
| 7,685,261 B1 * | 3/2010 | Marinelli et al. | 709/220 |
| 7,774,444 B1 * | 8/2010 | George et al. | 709/223 |
| 7,783,727 B1 * | 8/2010 | Foley et al. | 709/220 |

(Continued)

OTHER PUBLICATIONS

D. Feisthannel, et al., "Implementing IBM Systems Director 6.1", IBM Corp. Document No. SG24-7694-00, May 2009, Chapter 13, pp. 637-698.

(Continued)

*Primary Examiner* — Paul H. Masur
*Assistant Examiner* — Michael Phillips
(74) *Attorney, Agent, or Firm* — William K. Konrad; Konrad Raynes Davda & Victor LLP

(57) ABSTRACT

In one aspect of the present description, a systems manager based upon a common model of information protocol or standard includes automated storage area network (SAN) expansion management which permits additional provider modules to be automatically installed if needed in response to devices being added to the SAN. In addition, the automated SAN expansion management permits installed provider modules to be automatically configured in response to devices being added to the SAN. Still further, in another aspect, the automated SAN expansion management can automatically determine if a suitable host processor exists to host installation of a new provider module and if not, the automated SAN expansion management 20 can automatically deploy a suitable host processor such as a virtual server to host installation of a new provider module. Other features and aspects may be realized, depending upon the particular application.

24 Claims, 2 Drawing Sheets

(56) References Cited

U.S. PATENT DOCUMENTS

| | | | |
|---|---|---|---|
| 7,886,031 B1* | 2/2011 | Taylor et al. | 709/221 |
| 8,015,450 B1 | 9/2011 | Cooley et al. | |
| 8,769,522 B2* | 7/2014 | Venkatraman et al. | 717/173 |
| 8,775,577 B1* | 7/2014 | Alford et al. | 709/221 |
| 2004/0024854 A1* | 2/2004 | Mandal | 709/223 |
| 2004/0111505 A1* | 6/2004 | Callahan et al. | 709/223 |
| 2004/0243699 A1* | 12/2004 | Koclanes et al. | 709/224 |
| 2007/0220320 A1* | 9/2007 | Sen et al. | 714/13 |
| 2010/0088282 A1* | 4/2010 | Yamada et al. | 707/649 |
| 2011/0029970 A1* | 2/2011 | Arasaratnam | 718/1 |
| 2011/0093740 A1* | 4/2011 | Tsao | 714/4.12 |
| 2011/0202317 A1 | 8/2011 | Brown | |

OTHER PUBLICATIONS

D. Quintero, et al., "IBM Systems Director VMControl Implementation Guide on IBM Power Systems", IBM Corp., Document No. SG24-7829-00, Mar. 2010, pp. 1-238.

"Method and System for Simplifying Storage Management Environment Setup for IBM Systems Director", IP.com, Document No. IPCOM000198635D, Aug. 11, 2010, pp. 1-13.

U.S. Appl. No. 13/788,809, filed Mar. 7, 2013, entitled, Automated Deployment of Software for Managed Hardware in a Storage Area Network:, pp. 1-35.

Preliminary Remarks for U.S. Appl. No. 13/788,809, filed Mar. 7, 2013, entitled, Automated Deployment of Software for Managed Hardware in a Storage Area Network:, pp. 1-2.

First Office Action dated Oct. 2, 2013, p. 37, for U.S. Appl. No. 13/788,809, filed Mar. 7, 2013.

"Telecommunication Management Network Model", Wikipedia, [online] [retrieved Feb. 9, 2011] p. 1, . . . wikipedia.org/.../Telecommunication.

"Common Information Model (computing)", Wikipedia, [online] [retrieved Feb. 9, 2011] pp. 1-3, . . . wikipedia.org/.../Common_informati . . . .

"Element Management System", Wikipedia, [online] [retrieved Feb. 9, 2011] pp. 1-2, . . . wikipedia.org/.../Element_management . . . .

"IBM Director", Wikipedia, [online] [retrieved Feb. 9, 2011] pp. 1-3, . . . wikipedia.org/wiki./IBM_Director.

Response dated Jan. 1, 2014, p. 15, to First Office Action dated Oct. 2, 2013, p. 37, for U.S. Appl. No. 13/788,809, filed Mar. 7, 2013.

Supplemental Response dated Mar. 6, 2014, p. 17, to First Office Action dated Oct. 2, 2013, p. 37, for U.S. Appl. No. 13/788,809, filed Mar. 7, 2013.

Notice of Allowance for U.S. Appl. No. 13/788,809, dated Jun. 16, 2014, 26 pp.

Notice of Allowance for U.S. Appl. No. 13/788,809, dated Aug. 25, 2014.

* cited by examiner

AUTOMATED DEPLOYMENT OF SOFTWARE FOR MANAGED HARDWARE IN A STORAGE AREA NETWORK

BACKGROUND

1. Field

The present description relates to a method, system, and computer program product for automated deployment of software for managed hardware in a storage area network.

2. Description of Related Art

A storage area network (SAN) is frequently used to couple remote computer storage devices such as disk arrays, tape libraries, optical jukeboxes or other storage devices, to hosts in a manner which permits the storage devices to appear to the operating systems of the hosts as locally attached to the hosts. The storage area network may include a storage controller which may have multiple servers often referred to as a cluster of servers, which receive input/output (I/O) requests from one or more hosts, to perform input/output operations in which data is read from or written to storage through various I/O adapters. Each cluster may have one or more central processing units (CPUs) in which the processing and memory resources of the cluster may be apportioned into logical partitions, often referred to as a "virtual server," each of which is capable of running an operating system and performing the functions of a "server". Thus, as used herein, the term "server" may be used to refer to a physical server or a logical partition or virtual server performing a server function.

A server may have multiple I/O adapters including host and device adapters which are accessed through a switch such as a PCIe switch, for example. To increase efficiency, it is often desirable to share I/O adapters amongst the servers of the cluster. Thus, a device adapter, for example, may be shared as a "virtual" device adapter. The servers typically communicate with the device adapters and other I/O adapters over a "fabric" which may comprise one or more interfaces providing communication paths between the servers and adapters.

The fabric may include one or more switches which permit the I/O adapters to be shared by the servers. Each switch typically includes routing logic which logically couples a selected upstream port of the switch to a selected downstream port of the switch. In this manner, a particular server coupled to an upstream port, may be logically coupled to a particular device adapter coupled to a downstream port, for the purpose of conducting I/O operations between that server and storage via the device adapter. Similarly, a particular server coupled to an upstream port, may be logically coupled to a particular host coupled to a downstream port, for the purpose of conducting I/O operations between that server and host via the host adapter.

Thus, each server may be logically coupled to each I/O adapter of the shared adapters via the switch. Each switch typically further includes error reporting logic. In the course of an I/O operation, an error may be detected by the switch or one or more of the shared I/O or host adapters. The switch is configured or programmed to report the occurrence of an error via the "transparent" upstream port which is the upstream port connected to the root server for the switch and the shared I/O adapters coupled to the switch. The various devices of the storage area network may be managed by one or more users utilizing a systems manager which includes hardware and software and provides a suitable user interface. An example of systems manager software is the IBM Systems Director which can facilitate managing both physical and virtual systems across a multi-system environment which can include hardware and software from a variety of different vendors.

From a suitable access point such a browser, a systems manager permits a user to monitor system environmentals, resources, inventory, events, task management, core corrective actions, distributed commands, and hardware control for both servers and storage. The systems manager can provide views for visualizing managed systems and to assist the user in determining how these systems relate to one another while identifying their individual status.

Systems managers frequently use industry standards such as the Common Information Model (CIM), which is an industry standard for managing systems. CIM was designed to be used for describing management information between differing management applications, running in many different operating environments, including Microsoft Windows and Linux. CIM provides a common definition of management information for systems, networks, applications, and services, and allows for vendor extensions. CIM common definitions enable vendors to exchange rich management information between systems throughout the network. CIM is composed of a specification and a schema. The schema provides the actual model descriptions, while the specification defines the details for integration with other management models.

Another industry standard often utilized by a systems manager is the Storage Management Initiative Specification (SMI-S), which is an industry standard for accessing and managing individual storage devices including RAID controllers, disk storage devices, SAN switches, etc. SMI-S defines a method for the interoperable management of a heterogeneous storage area network (SAN). SMI-S expands on the CIM standards, using Extensible Markup Language (XML) over hypertext transfer protocol (HTTP) to communicate between storage management applications and the devices that they manage. The specification standardizes and streamlines storage management functions and features into a common set of tools that address the day-to-day tasks of the information technology environment. Common systems management functionality such as discovery, inventory, system configuration, and event notification can be achieved using the SMI-S standard.

Accordingly, to manage the individual devices of the SAN, a systems manager will communicate with a provider module often referred to as an "SMI-S provider" which is often vendor-specific software although compliant with the SMI-S standard. The SMI-S provider module is used so that independent systems manager software, such as IBM Systems Director, can manage a vendor device using a standard interface based on the industry standard Common Information Model (CIM) protocol.

A user typically manually installs and configures an SMI-S provider module on a remote server. Once installed, the SMI-S provider module can further be configured through an interface provided to the user by the systems manager. The configuration typically includes details relating to the specific device being added to the SAN. Thus, configuration may include manually inputting security configuration (such as password credentials, for example), network configuration data (such as the IP address) of the device.

Some SMI-S provider modules can manage more than one device. Thus, if the device being managed is a storage array controller, for example, as more storage array controllers are added to the network, the SMI-S provider module already installed for those types of storage array controllers may be manually configured each time a storage array controller compatible with that SMI-S provider module is added to the network. However, SMI-S provider modules typically have a limit on the number of devices which any one SMI-S provider module can manage.

Hence, when adding a new device to the network, the user frequently needs to determine if any installed SMI-S provider module is suitable for the device to be added and if so, whether configuring the compatible SMI-S provider module for the new device will exceed the limitation placed on the total number of devices which may be managed by that particular SMI-S provider module. The limit on the number of devices per SMI-S provider module can vary from vendor to vendor. If the new device will exceed the limit of devices for the installed SMI-S provider module compatible with the new device, an additional suitable SMI-S provider module may be manually installed and manually configured for the new device.

Also, the systems manager software may have restrictions on the level or version of provider module that is supported by the systems manager software. Accordingly, before a provider module is installed, the user may need to upgrade the level or version of the provider module. This process typically involves the user identifying the correct provider module that is both compatible with the firmware version of the device being added to the network, as well as compatible with the systems manager software.

Still further, the user using the interface provided by the systems manager, may determine that a suitable server for hosting installation of the new provider module is not available. Hence, the user may need to manually reallocate additional resources to an existing server or manually deploy another server such as a virtual server to host the new provider module, again using the interface provided by the systems manager. If a new server is deployed, the user typically manually installs an operating system on the new server and manually allocates sufficient resources to the new server to accommodate the new provider module once it is manually installed on the new server and configured by the user.

SUMMARY

In one aspect of the present description, operations are described for managing a plurality of storage area network devices in which a storage area network device may be added to the network and a provider module for managing the device may be automatically installed on a host processor if needed, in connection with the addition of the new device. In addition, a host processor such as a virtual server may be at least substantially automatically deployed if needed to host a provider module for a device being added.

In one embodiment, management operations are provided by a systems manager based upon a common model of information protocol wherein the systems manager includes a processor and instructions and manages storage area network devices through provider modules, each provider module managing one or more specific storage area network devices in accordance with a common storage management protocol. Management operations may include, in one embodiment, at least substantially automatically receiving by the systems manager, storage area network device information for a storage area network device to be managed by the systems manager; in response to the received storage area network device information, the systems manager at least substantially automatically determining if an installed provider module is suitable for the storage area network device to be managed by the systems manager; in response to a determination by the systems manager that an installed provider module is suitable for the storage area network device to be managed by the systems manager, the systems manager at least substantially automatically identifying the provider module determined to be suitable for the storage area network device to be managed by the systems manager; and in response to a determination by the systems manager that an installed provider module is not suitable for the storage area network device to be managed by the provider module, the systems manager at least substantially automatically installing in a provider server an additional provider module that is suitable for the storage area network device to be managed by the systems manager.

In another aspect of the present description management operations may include, in response to an identification by the systems manager that an installed provider module is suitable to manage the storage area network device, the systems manager at least substantially automatically configuring the identified installed provider module for managing the storage area network device through the systems manager; and in response to installation by the systems manager of an additional provider module that is suitable for the storage area network device to be managed by the systems manager, the systems manager at least substantially automatically configuring the installed additional provider module for managing the storage area network device through the systems manager.

In yet another aspect of the present description management, operations may include, in response to the systems manager installing and configuring the additional provider module that is suitable for the storage area network device to be managed by the systems manager, the systems manager at least substantially automatically discovering the installed and configured additional provider module for the storage area network device to be managed by the systems manager. In one embodiment, operation of the systems manager installing an additional provider module that is suitable for the storage area network device to be managed, further includes the systems manager at least substantially automatically determining if a deployed virtual server of a provider server is suitable for hosting installation of the additional provider module.

In still another aspect of the present description management, operations may include, in response to a determination that a deployed virtual server of a provider server is suitable for hosting installation of the additional provider module, the systems manager at least substantially automatically identifying the deployed virtual server determined to be suitable for hosting installation of the additional provider module, and at least substantially automatically installing the additional provider module on the deployed virtual server identified as being suitable for installing the additional provider module. In one embodiment, an operation of the systems manager installing an additional provider module that is suitable for the storage area network device to be managed, further includes the systems manager at least substantially automatically determining if a deployed virtual server of a provider server is suitable for hosting installation of the additional provider module; and in response to a determination that a deployed virtual server of a provider server is not suitable for hosting installation of the additional provider module, the systems manager at least substantially automatically deploying an additional virtual server which is suitable for hosting installation of the additional provider module, and at least substantially automatically installing the additional provider module on the deployed additional virtual which is suitable for hosting installation of the additional provider module.

In still another aspect of the present description management, the systems manager determining if an installed provider module is suitable for the storage area network device to be managed by the systems manager, further includes: at least substantially automatically determining if an installed provider supports the storage area network device to be managed by the systems manager; and in response to a determination that a particular installed provider supports the storage area network device to be managed by the systems manager, the systems manager further: automatically determining the limit of storage area network devices that can be managed by the particular installed provider; determining the current number of storage area network devices being managed by the particular installed provider; automatically determining if the determined current number of storage area network devices that can be managed by the particular installed provider is less than the determined limit of storage area network devices that can be managed by the particular installed provider; and in response to a determination that the determined current number of storage area network devices that can be managed by the particular installed provider is less than the determined limit of storage area network devices that can be managed by the particular installed provider, automatically determining that the particular installed provider module is suitable for the storage area network device to be managed by the systems manager.

In yet another aspect of the present description management, the systems manager determining if a deployed virtual server of a provider server is suitable for hosting installation of the additional provider module further comprises automatically comparing predetermined server resource requirements for the additional provider module to available resources of available deployed virtual servers, and automatically determining a suitable deployed virtual server of for hosting installation of the additional provider module. In one embodiment, the predetermined virtual server resource requirements for the additional provider module include at least one of disk storage space, memory space and processor resources. In another embodiment, the systems manager deploying an additional virtual server which is suitable for hosting installation of the additional provider module, includes at least substantially automatically deploying a virtual server which at least meets the predetermined virtual server resource requirements for the additional provider module.

Other features and aspects may be realized, depending upon the particular application.

DETAILED DESCRIPTION

Figure 1:
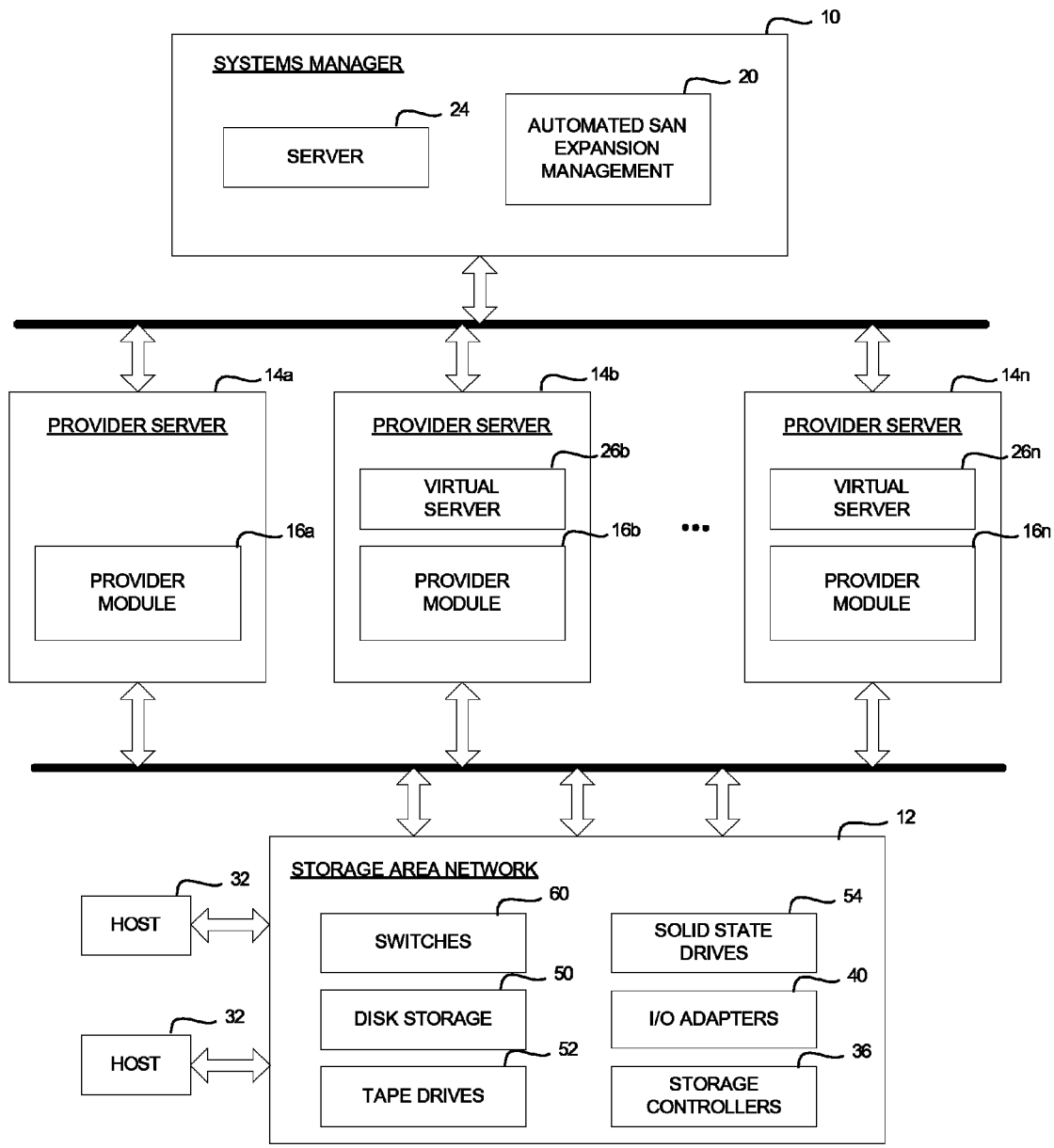
FIG. 1 illustrates an embodiment of a computing environment in which an aspect of the present description may be employed.

FIG. 1 illustrates one example of a computing environment in which aspects of the present description may be employed. A systems manager 10, based upon a common model of information protocol or standard, such as the CIM standard, for example, manages a plurality of devices of a storage area network (SAN) 12 through provider modules of a plurality of provider servers 14a, 14b, . . . 14n.

Each provider servers 14a, 14b, . . . 14n includes an installed provider module 16a, 16b, 16n which facilitates management of one or more devices of the SAN 12 by the network manger 10 in accordance with one or more industry management standards, such as the SMI-S standard. As explained in greater detail below, the systems manager 10 includes automated SAN expansion management 20 which permits additional provider modules to be automatically installed if needed in response to devices being added to the SAN 12. In addition, the automated SAN expansion management 20 permits installed provider modules to be automatically configured in response to devices being added to the SAN 12.

Still further, in another aspect, the automated SAN expansion management 20 can automatically determine if a suitable host processor exists to host installation of a new provider module and if not, the automated SAN expansion management 20 can automatically deploy a suitable host processor such as a virtual server to host installation of a new provider module. Although the systems manager 10 has been described as using the CIM and SMI-S standards or protocols, it is appreciated that other industry standards and protocols may be used, depending upon the particular application.

In one embodiment, the systems manager 10 includes one or more servers 24, each including a processor and a memory containing program instructions. Each processor can include one or more central processing units (CPUs) available as processing resources to the associated server. It is appreciated that the number of servers 24 may depend upon the particular application. The automated SAN expansion management 20 may be software, hardware or a combination thereof.

Each server 24 of the systems manager 10 may have one or more logical partitions executing as a virtual server in the physical server. Each logical partition or virtual server separately executes an operating system and device drivers. The logical partitions or virtual servers comprise a division of the processors into logically independent but cooperating processing systems each having their own operating systems and device drivers. Multiple logical partitions or virtual servers may execute in each physical server, managed by a supervisor module for that physical server.

As noted above, each provider server 14a, 14b, . . . 14n includes a provider module 16a, 16b, 16n which facilitates management of one or more devices of the SAN 12 by the network manger 10 in accordance with one or more industry management standards. In the embodiment of FIG. 1, each provider server 14a, 14b, . . . 14n includes a physical server (e.g. provider server 14a) or a virtual server 26b . . . 26n, each of which may be a logical partition of the servers 24, for example or another server or servers, depending upon the particular application. The provider module 16a, 16b, 16n of each provider server 14a, 14b, . . . 14n executes on the associated physical server or virtual server 26b . . . 26n. As explained in greater detail below, virtual servers or logical partitions may be added automatically as needed to accommodate additional provider modules as needed. It is appreciated however, that in other embodiments, one or more of the provider servers 14b, . . . 14n may utilize physical servers.

In the example of FIG. 1, one or more hosts 32 communicate Input/Output (I/O) tasks or other processing requests directed to storage of the SAN 12, through a storage cluster or controller 36, where the storage controller 36 manages access to the storage of the SAN 12. In one embodiment, the storage controller 36 includes a plurality of servers, each including a processor and a memory. Each processor can include one or more central processing units (CPUs) available as processing resources to the associated server. It is appreciated that the number of servers may depend upon the particular application.

In a manner similar to the servers 24, each server of the storage controller 36 may also have one or more logical partitions or virtual servers executing in the server. Each logical partition virtual server separately executes an operating system and device drivers. The logical partitions of the servers of the storage controller 36, like the logical partitions of the servers of the systems manager 10, comprise a division of the processors into logically independent but cooperating processing systems each having their own operating systems and device drivers. Multiple logical partitions may execute in each server, managed by a supervisor module for that server.

Each device driver of a server partition provides an interface between the operating system in the logical partition in which the device driver executes, and a device, such as an I/O adapter of the I/O adapters 40 which include host adapters and device adapters. The host adapters enable the servers of the storage controller 36 to communicate with the hosts 32 and the device adapters enable the servers of the storage controller 36 to communicate with the storage of the SAN 12, which may include one or more suitable storage devices, such as interconnected hard disk drives (e.g., configured as a DASD, RAID, JBOD, etc.) 50, magnetic tape drives 52, solid state electronic memory drives 54, etc. Switches 60 of a fabric provide communication paths between the various elements of the SAN 12. In one embodiment, the fabric may comprise a Fibre Channel arbitrated loop configuration, a serial loop architecture or a bus interface, such as a Peripheral Component Interconnect (PCI) interface such as a PCI-Express interface.

The hosts 32 may communicate with the storage controller 36, via the adapters 40 and the switches 60, over a network, such as a Local Area Network (LAN), Storage Area Network (SAN), Wide Area Network (WAN), wireless network, etc. Alternatively, the hosts 32 may communicate with the storage controller 36 over a bus interface, such as a Peripheral Component Interconnect (PCI) bus or serial interface. It is further appreciated that the storage controller 36 may also be, for example, a generic server, not just a storage subsystem or storage controller. For example, the storage controller 36 could include IBM pSeries servers running a highly available cluster application such as Lotus Notes®.

Figure 2:
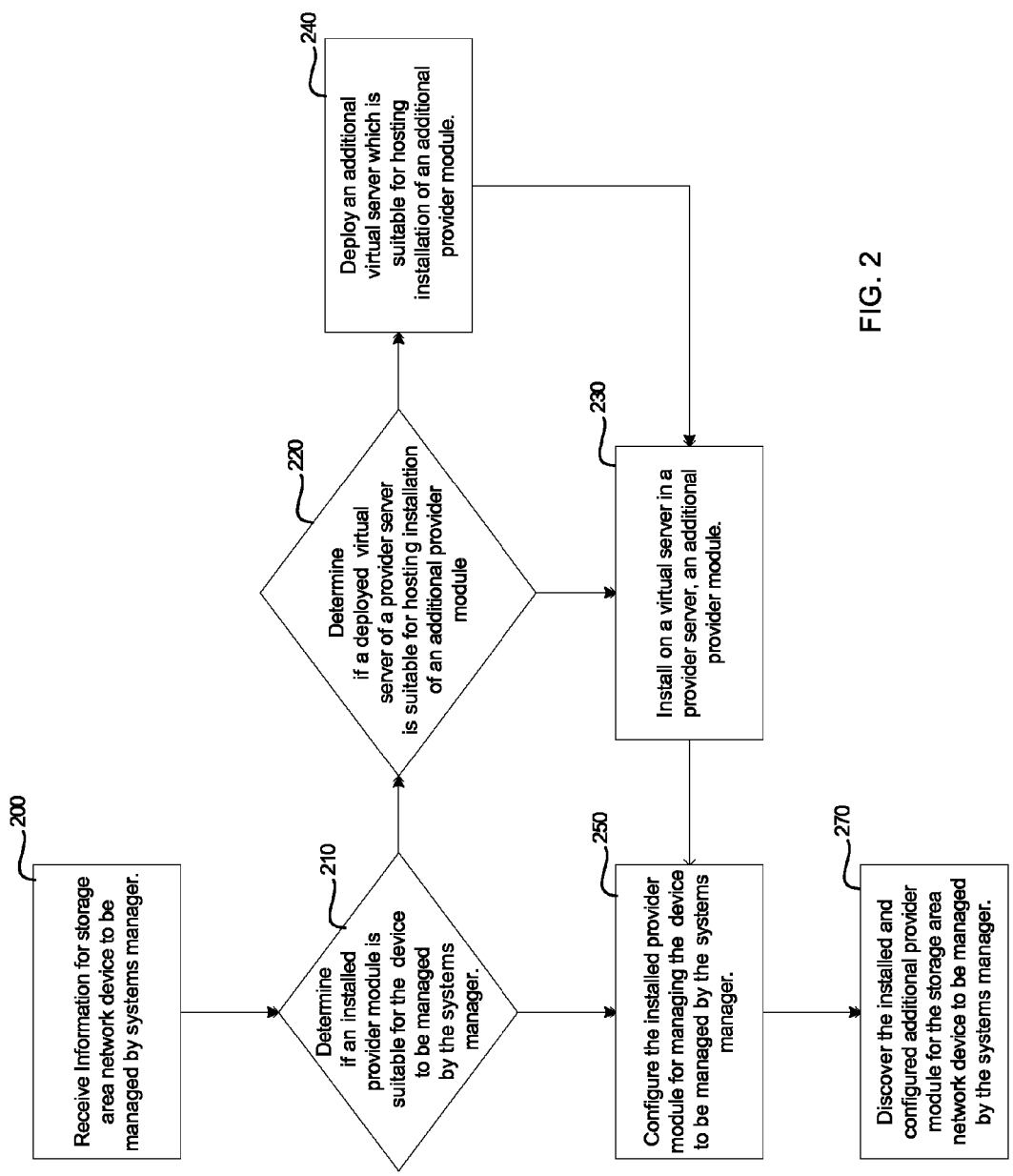
FIG. 2 depicts an example of operations for managing expansion of a network in accordance with one embodiment of the present description.

As previously mentioned, the SAN expansion management 20 permits provider modules to be automatically installed or configured as needed in response to devices being added to the SAN 12. FIG. 2 shows an example of operations of a systems manager having automated SAN expansion management in accordance with one embodiment of the present description. In one operation, a systems manager such as the systems manager 10, receives (block 200) device information for a storage area network device to be managed by the systems manager. In one embodiment, the systems manager 10 may gather device information including security, network, and model type information for the new storage area network device added to the network. It is appreciated that other types of information may be gathered for the device being added to the network, depending upon the particular application.

In some applications, the systems manager 10 may be programmed to gather such information automatically, including fully automatically, that is, without data input or other assistance by a human operator or user, and at least substantially automatically, that is, without substantial data input or other substantial assistance by a human operator or user. The automatic gathering of device information may be triggered in response to detection by the systems manager 10, of a device being added to the network. Conversely, if some or all of the device information is not gathered automatically, the remaining device information for the new device may be inputted manually by a user through a suitable user input such as a web interface, for example, to the systems manager 10, in connection with adding a new device to the network.

The received storage area network device information is used by the systems manager 10 in determining (block 210) if an installed provider module is suitable for the storage area network device to be managed by the systems manager 10. Thus, model type information, for example, may be used by the systems manager 10 to locate and retrieve property information for the particular device model including the requirements of the device for a suitable provider module. The device property information may be maintained in a local database or may be retrieved remotely from a remote database such as one maintained on the Internet, for example. Device property information may also be obtained by the systems manager issuing suitable queries to the added device, depending upon the capabilities of the device prior to configuration of a provider module for the new device. In addition, previously used values or default values may be used by the systems manager where appropriate to complete the automatic information gathering or to supplement manually inputted information.

Thus, if the gathered device information satisfies requirements imposed by the management software of the systems manager 10, the systems manager may then initiate an automated process of identifying (block 210) a suitable provider module already installed in a provider server that can manage that device. However, if some or all of the device information gathered automatically does not satisfy requirements imposed by the management software of the systems manager 10, the remaining device information for the new device may be inputted manually by a user through a suitable user input such as a web interface, for example, to the systems manager 10.

To assist in determining whether a suitable provider module has already been installed in a provider server that can manage that device, the systems manager 10 may maintain, for example, an inventory of existing, that is, already installed provider modules and data identifying the properties of each of the installed providers including the capabilities and requirements of each installed provider module. The provider module property information may be maintained in a local database or may be retrieved remotely from a remote database such as one maintained on the Internet, for example. Provider module property information may also be obtained in some cases by the systems manager issuing suitable queries to a particular provider module, depending upon the capabilities of the provider module. In addition, previously used values or default values may be used by the systems manager where appropriate to complete the automatic information gathering or to supplement manually inputted information.

By comparing the capabilities and requirements for the device being added to the network, to the capabilities and requirements of the installed provider modules, the systems manager can determine if a suitable provider module for the device is already installed. In some applications, the systems manager 10 may be programmed to determine automatically whether a suitable provider module for the device is already installed, without substantial data input or other assistance by a human operator or user.

The automatic determination of whether a suitable existing provider module has been installed, may be triggered in response to receipt of suitable device information by the systems manager 10, for a device being added to the network. Thus, the systems manager 10 may be programmed to determine automatically whether a suitable provider module for the device is already installed, including fully automatically and at least substantially automatically, that is, without substantial data input or other assistance by a human operator or user, following receipt of suitable device information by the systems manager 10, for a device being added to the network. Conversely, if some or all of the determination is not performed automatically, the remaining portion of the determination of a suitable existing suitable provider module for the new device may be performed manually by a user through a suitable user input such as a web interface, for example, to the systems manager 10, in connection with adding a new device to the network. Thus, through the graphical user interface provided by the systems manager, a user can compare various capabilities and requirements for the device being added to the network, to the capabilities and requirements of the installed provider modules, and determine if a suitable provider module for the device is already installed.

For some types of provider modules, there may be a maximum number of devices which may be managed by any one provider module. Hence, in determining whether a suitable provider module for the device is already installed, the systems manager may determine whether the number of supported devices being managed by a particular installed provider module is already at the maximum number of devices for that provider module. The systems manager can automatically determine whether a particular provider module has a maximum number of devices which may be managed by the provider module by retrieving that information from the provider module property information maintained for that provider module. The current number of devices being managed by an installed provider module may be automatically compared by the systems manager to the maximum, if any, of the devices which may be managed by that provider module.

If the limit on devices under management of the provider module has already been reached for a particular provider module, the systems manager may continue comparing the capabilities and requirements for the device being added to the network, to the capabilities and requirements of the remaining installed provider modules until either a suitable installed provider module for the device is identified, or a determination (block 210) is made that a suitable provider module for the device needs to be installed. In some applications, the systems manager 10 may be programmed to determine automatically whether the number of supported devices being managed by a particular installed provider module is already at the maximum number of devices for that provider module without input or other assistance by a human operator or user. Alternatively, if some or all of the determination of whether a device limit would be exceeded is not made automatically, some or all of the device limit determination may be manually by a user through a suitable graphical user input such as a web interface, for example, to the systems manager 10.

If it is determined (block 210) that a suitable provider module has not already been installed, a new provider module may be automatically created by installing (block 230) a suitable additional provider module software on a suitable hosting processor such as a virtual server of a provider server. It is appreciated that additional provider modules may be installed on other types of hosting processors such as physical provider server 14a, for example.

Prior to installing the provider module, the systems manager can determine (block 220) whether a virtual server or other processor suitable for hosting installation of an additional provider module has already been deployed in a provider server. In some applications, the systems manager 10 may be programmed to determine automatically without substantial data input or other assistance by a human operator or user, as to whether a suitable virtual server or other hosting processor has already been deployed. The automatic determination and of whether a suitable virtual server has already been deployed may be triggered, for example, in response to a determination (block 210) by the systems manager 10 or by a user through the systems manager interface, that a suitable installed provider module is not available. Alternatively, if some or all of the determination of whether a suitable hosting processor is available is not made automatically, some or all of the suitable hosting processor availability determination may be made manually by a user through a suitable user input such as a web interface, for example, to the systems manager 10.

In one embodiment, automation of the suitable hosting processor availability determination may be facilitated by, in advance of adding any new devices to the network, providing an opportunity to a user to preselect already deployed virtual servers or other hosting processors as possibly suitable candidates for hosting additional provider modules to be installed as needed in the event that additional devices are added to the network. Thus in response to a determination (block 210) that a suitable provider module has not already been installed, the systems manager can automatically determine (block 220) whether a suitable virtual server or other hosting processor has already been deployed by examining the preselected candidates and comparing the capabilities and requirements of the deployed preselected candidates to the capabilities and requirements of the provider module to be installed. Data identifying the properties of each of the deployed candidates including the capabilities and requirements of each deployed candidate may be maintained in a local database or may be retrieved remotely from a remote database such as one maintained on the Internet, for example. Information on deployed server candidates may also be obtained by the systems manager issuing suitable queries to the particular server or other processor, depending upon the capabilities of the processor. For example, a systems manager can issue queries to a provider module compatible with the Common Information Protocol (CIM) to obtain information on the resources available to the server on which the provider module is installed. In addition, previously used values or default values may be used by the systems manager where appropriate to complete the automatic information gathering or to supplement manually inputted information.

If a suitable candidate is not identified amongst the preselected candidates, the systems manager can further determine (block 220) whether a suitable virtual server or other hosting processor has already been deployed by examining the remaining deployed virtual servers or other hosting processors and comparing the capabilities and requirements of the remaining deployed candidates to the capabilities and requirements of the provider module to be installed. In determining whether a deployed candidate is suitable for hosting installation of an additional provider module, the data manager can compare the requirements of the software of the provider module to be added and the resources or capabilities of deployed candidates for hosting installation of the provider module to determine if an existing server can support (block 220) the installation of the provider module.

As previously mentioned, provider module property information including requirements of the provider module, may be obtained by the systems manager from a database or from other suitable information resources such as issuing queries. Thus, the requirements of the provider module may include, for example, the supported operating systems, the required network ports, required disk space, required memory, required processing power, known software conflicts, supported server platforms, required specialty hardware, maximum number of supported devices per provider module, etc.

In a similar manner, the systems manager may identify the resources available on a given server. These resources may include, for example, the installed operating system, the network ports that are in use, available disk space, available memory, processing power, installed software, the server hardware platform, and any additional hardware that is installed. The information for a particular server or other processor can be collected by the systems manager from a database, or in responses to queries directed to a provider module installed on the server, or in responses to queries sent directly to the server, or from other information resources.

In addition to the above described static information, additional information can be dynamically determined in connection with determining whether a deployed candidate is suitable for hosting installation of an additional provider module. Examples of dynamic information may include scanning the server for ports that are listening, checking the average load of the processor and memory, etc. of the candidate server. Again, such dynamic information may be collected through inquiries directed to a provider module installed on the server, or queries sent directly to the server, or from other information resources.

In one embodiment, once a suitable virtual server (or other processor) is located to host the new provider module, the new provider module may be installed (block 230) on the selected processor in a provider server. In another embodiment, a number of suitable virtual servers (or other processors) may be located that meet the requirements of the provider module, and a best virtual server may be selected amongst those candidates located and determined to be suitable for hosting installation of the new provider module. Thus, for example, once all the required information concerning the provider module requirements and the resources of the available virtual servers has been collected, the systems manager can be programmed to at least substantially automatically compare data pairs of a provider modules requirement and a corresponding server resource and identify the best server to host the provider module. For example, one such data pair is the disk space required by the new provider module and the available disk space of the candidate host server. By comparing each data pair for each provider module requirement and the associated available resource of each candidate server, the best server to host the new provider module may be identified.

In a manual embodiment, some or all of the required information concerning the provider module requirements and the resources of the available virtual servers may be input by the user through the user input of the systems manager. In addition, the user may, using the web interface, manually compare data pairs of a provider modules requirement and a corresponding server resource from the manually inputted information, and determine the best server to host the provider.

By comparison, in an automatic embodiment, the systems manager can be programmed to collect all the required information concerning the provider module requirements and the resources of the available virtual servers automatically, including fully automatically, that is, without data input or other assistance from the user, and at least substantially automatically, that is, without substantial data input or other substantial assistance from the user. Also, in an automatic embodiment, the systems manager may compare data pairs of a provider modules requirement and a corresponding server resource from the manually inputted or automatically collected information, and identify the best server to host the provider, automatically, including fully automatically, that is, without comparison of data pairs by a user through the user input, and at least substantially automatically, that is, without substantial without substantial comparison of data pairs by a user through the user input.

In comparing the requirements of the provider module to be installed with the resources of the existing candidate host servers, the systems manager may determine that a suitable host server is not available. For example, it may be determined that no already deployed host server has sufficient disk space to accommodate the new provider module. If so, the systems manager can deploy (block 240) a new host processor such as a virtual server which is suitable for hosting installation of the additional provider module. Thus, a new virtual server may be created which fits the requirements of the provider module to be installed based on, for example, the known static values of the provider module requirements and the resources to be provided to the new virtual server.

In some applications, the systems manager 10 may be programmed to deploy a new host server, automatically, including fully automatically, that is, without data input or other assistance from the user, and at least substantially automatically, that is, without substantial data input or other substantial assistance by a human operator or user. The automatic deployment of a host server may be triggered, for example, in response to a determination by the systems manager 10 or by a user through the systems manager interface, that a suitable existing host server is not available. In one embodiment, suitable virtualization technology may be used by the systems manager to automatically create a new virtual server, and afterwards install the operating system and provider software. Thus, if the systems manager does not locate a suitable existing host server, the systems manager may be programmed to automatically locate a physical server which is capable of hosting virtual servers. For example, a physical server which runs suitable hypervisor software may be capable of hosting virtual servers.

In one embodiment, systems manager software such as IBM Director may have a plug-in module such as VMControl, which facilitates creation and management of virtual servers. In the illustrated embodiment, the systems manager 10 may be programmed to deploy a new virtual server automatically, including fully automatically, that is, without data input or other assistance from the user, and at least substantially automatically, that is, without substantial data input or other substantial assistance by a human operator or user, in response to a determination that a suitable existing host server is not available.

Alternatively, if the host server is not deployed automatically, a host server may be deployed manually by a user through a suitable user input such as a web interface, for example, to the systems manager 10. For example, the VMControl plug-in of the IBM Director management software provides a web based graphical user interface through which a user can select a target physical server and can activate a wizard to facilitate the creation of the virtual server on the selected physical server by the user. Once the wizard receives the required manual inputs from the user, the wizard can complete the creation of the virtual server.

Thus, in a manual virtual server creation using a wizard, the user may manually input information such as the virtual server (LPAR or logical partition) name, the planned operating system (OS), the processor allocation, memory allocation, disk allocation or creation, physical slot (storage controller) selection, virtual ethernet network adapter creation or selection, physical device selections to be assigned to the virtual server, physical slot selections to be assigned to the virtual server, etc. In an automatic embodiment, the information required by a wizard, for example, is instead collected or generated automatically by the systems manager.

To facilitate automatic deployment of a suitable host virtual server, a suitable operating system image may be created in advance, that is prior to and in anticipation of a need arising for deployment of a suitable host server for installation of a new provider module. Accordingly, as the new virtual server is being created, the systems manager can retrieve the previously stored operating system image from suitable local, or remote storage (for example, file or block storage) and load the operating system image in the memory allocated to the new virtual server. Once booted, the new virtual server may have a functioning operating system and be ready for installation of the new provider module.

Alternatively, an operating system image with the supported level of provider module may be created in advance. Accordingly when the operating system of the new virtual server is up and running, the provider module software will already be installed (block 230) and will be available for use as well, obviating the need for separately installing the provider module.

Also, to facilitate automatic deployment of a suitable host virtual server, an automatic configuration protocol such as Dynamic Host Configuration Protocol (DHCP) may be utilized by the systems manager so that the new host virtual server can communicate with other computers on the network. Network configuration protocols such as DHCP allows a computer to be configured automatically, eliminating the need for intervention by a network administrator. It also provides a central database for keeping track of computers that have been connected to the network to avoid two computers from accidentally being configured with the same IP address.

As previously mentioned, once a suitable virtual server (or other processor) is located to host the new provider module, the new provider module may be installed (block 230) on the selected processor in a provider server. In some applications, the systems manager 10 may be programmed to install provider module software on a server automatically, including fully automatically, that is, without data input or other assistance from the user, and at least substantially automatically, that is, without substantial data input or other substantial assistance by a human operator or user. The automatic installation of the provider module may be triggered in response to identification by the systems manager 10 or by a user through the systems manager interface, of a suitable host processor for hosting installation of the provider module. In one embodiment, the automated SAN expansion management may have access to stored versions of the provider module software that are supported by the systems manager 10, or may be programmed with the locations in a remote database or the internet from which to download the supported versions. This can facilitate compatibility amongst all software since the systems manager can be programmed to identify what it supports and what the provider modules support, therefore yielding a compatible environment.

Alternatively, if the provider module software is not installed on a server automatically, the provider module software may be installed manually by a user through a suitable user input such as a web interface, for example, to the systems manager 10, in connection with installing the new provider module. For example, the SAN expansion management may document for the user the levels of provider modules supported by the systems manager and provide links to suitable locations such as the provider manufacturer's website where a user can download the provider software for installation on a host server.

As noted above, by comparing the capabilities and requirements for the device being added to the network, to the capabilities and requirements of the available provider modules, the systems manager can identify a suitable provider module to be installed for the device being added. In some applications, the systems manager 10 may be programmed to identify automatically a suitable provider module to be installed for the device being added, without substantial data input or other assistance by a human operator or user.

Once a suitable provider module is identified, either from the existing installed provider modules (block 210) or as a newly installed provider module (block 230), the provider module is configured (block 250) by the systems manager to manage that new storage device. As previously mentioned, configuration of a provider module typically includes details relating to the specific device being added to the SAN which will be managed by the provider module. Thus, configuration may include the systems manager inputting into the provider module security configuration (such as password credentials, for example), and network configuration data (such as the IP address) of the device.

In some applications, the systems manager 10 may be programmed to configure the new provider module automatically, including fully automatically, that is, without data input or other assistance from the user, and at least substantially automatically, that is, without substantial data input or other substantial assistance by a human operator or user. The automatic configuration of a provider module may be triggered, for example, in response to a determination by the systems manager 10 or by a user through the systems manager interface, that a suitable provider module has been identified or installed by the systems manager or manually by a user. Alternatively, if the provider module is not configured automatically, the new provider module may be configured manually by a user through a suitable user input such as a web interface, for example, to the systems manager 10.

Once the provider module has been configured for the new device, the newly configured provider module may be discovered (block 270) to initiate management of the new device by the systems manager. In some applications, the systems manager 10 may be programmed to discover the configured provider module automatically, including fully automatically, that is, without data input or other assistance from the user, and at least substantially automatically, that is, without substantial data input or other substantial assistance by a human operator or user. The automatic discovery of the configured provider module may be triggered in response to configuration by the systems manager 10 or by a user through the systems manager interface, of the provider module server.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The variables "a" and "b" when used to represent a variable number of an element may indicate any number of instances of the element, and may indicate different integer numbers when used with different elements or when used with different instances of the same element. For instance variables "a" and "b" used to indicate a number of a source storage and target storage may indicate the same or different number of these elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 2 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A system for use with a storage area network having storage area network devices, comprising:
    a plurality of provider servers having provider modules installed thereon, each provider module managing one or more specific storage area network devices in accordance with a common storage management protocol; and
    a systems manager including a processor and a computer readable storage medium having computer readable program code embodied therein executed by the processor to perform operations, the operations comprising:
    managing a plurality of storage area network devices based upon a common model of information protocol wherein the systems manager manages storage area network devices through the provider modules installed on the provider servers;
    receiving by the systems manager, storage area network device information for a storage area network device to be managed by the systems manager;
    in response to the received storage area network device information, the systems manager automatically determining if an installed provider module is suitable for the storage area network device to be managed by the systems manager;
    in response to a determination by the systems manager that an installed provider module is suitable for the storage area network device to be managed by the systems manager, the systems manager identifying the provider module determined to be suitable for the storage area network device to be managed by the systems manager; and
    in response to a determination by the systems manager that an installed provider module is not suitable for the storage area network device to be managed by the systems manager, the systems manager automatically installing in a provider server an additional provider module that is suitable for the storage area network device to be managed by the systems manager.

2. The system of claim 1 wherein the operations further comprise:
    in response to an identification by the systems manager that an installed provider module is suitable for the storage area network device to be managed by the systems manager, the systems manager automatically configuring the identified installed provider module for managing the storage area network device to be managed by the systems manager; and
    in response to installation by the systems manager of an additional provider module that is suitable for the storage area network device to be managed by the systems manager, the systems manager automatically configuring the installed additional provider module for managing the storage area network device to be managed by the systems manager.

3. The system of claim 2 wherein the operations further comprise:
    in response to the systems manager installing and configuring the additional provider module that is suitable for the storage area network device to be managed by the systems manager, the systems manager automatically discovering the installed and configured additional provider module for the storage area network device to be managed by the systems manager.

4. The system of claim 2 wherein the systems manager installing an additional provider module that is suitable for the storage area network device to be managed by the systems manager, further includes the systems manager automatically determining if a deployed virtual server of a provider server is suitable for hosting installation of the additional provider module; and
    in response to a determination that a deployed virtual server of a provider server is suitable for hosting installation of the additional provider module, the systems manager automatically identifying the deployed virtual server determined to be suitable for hosting installation of the additional provider module, and automatically installing the additional provider module on the deployed virtual server identified as being suitable for installing the additional provider module.

5. The system of claim 2 wherein the systems manager installing an additional provider module that is suitable for the storage area network device to be managed by the systems manager, further includes the systems manager automatically determining if a deployed virtual server of a provider server is suitable for hosting installation of the additional provider module; and
    in response to a determination that a deployed virtual server of a provider server is not suitable for hosting installation of the additional provider module, the systems manager automatically deploying an additional virtual server which is suitable for hosting installation of the additional provider module, and installing the additional provider module on the deployed additional virtual which is suitable for hosting installation of the additional provider module.

6. The system of claim 1, wherein the systems manager determining if an installed provider module is suitable for the storage area network device to be managed by the systems manager, further includes:
    automatically determining if an installed provider module supports the storage area network device to be managed by the systems manager; and
    in response to a determination that a particular installed provider supports the storage area network device to be managed by the systems manager, the systems manager further:
    automatically determining the limit of storage area network devices that can be managed by the particular installed provider;

automatically determining the current number of storage area network devices being managed by the particular installed provider;

automatically determining if the determined current number of storage area network devices that can be managed by the particular installed provider is less than the determined limit of storage area network devices that can be managed by the particular installed provider; and in response to a determination that the determined current number of storage area network devices that can be managed by the particular installed provider is less than the determined limit of storage area network devices that can be managed by the particular installed provider, automatically determining that the particular installed provider module is suitable for the storage area network device to be managed by the systems manager.

7. The system of claim 4 wherein the systems manager determining if a deployed virtual server of a provider server is suitable for hosting installation of the additional provider module further comprises automatically comparing predetermined virtual server resource requirements for the additional provider module to available resources of available deployed virtual servers, and automatically determining a suitable deployed virtual server of for hosting installation of the additional provider module.

8. The system of claim 7 wherein the predetermined virtual server resource requirements for the additional provider module include at least one of disk storage space, memory space and processor resources.

9. The system of claim 5 wherein the systems manager deploying an additional virtual server which is suitable for hosting installation of the additional provider module, includes automatically deploying a virtual server which at least meets the predetermined virtual server resource requirements for the additional provider module.

10. The system of claim 1 wherein the receiving by the systems manager, storage area network device information for a storage area network device to be managed by the systems manager, includes receiving model type information for the storage area network device to be managed by the systems manager, and wherein the systems manager automatically determining if an installed provider module is suitable for the storage area network device to be managed by the systems manager, includes the systems manager automatically determining if an installed provider module is suitable for the storage area network device to be managed by the systems manager as a function of the received model type information.

11. The system of claim 5 wherein the systems manager automatically determining if a deployed virtual server of a provider server is suitable for hosting installation of the additional provider module, includes the systems manager automatically determining if a deployed virtual server of a provider server is suitable for hosting installation of the additional provider module as a function of known software conflicts.

12. The system of claim 5 wherein the systems manager automatically determining if a deployed virtual server of a provider server is suitable for hosting installation of the additional provider module, includes the systems manager collecting information concerning the provider module requirements and the resources of the available virtual servers and automatically comparing data pairs of a provider modules requirement to identify a suitable virtual server to host the provider module.

13. A computer program product for managing a storage area network, the computer program product comprising a computer readable storage device having computer readable program code embodied therein that executes to perform operations, the operations comprising:

managing a plurality of storage area network devices using a systems manager based upon a common model of information protocol wherein the systems manager includes a processor and instructions and manages storage area network devices through provider modules installed on provider servers, each provider module managing one or more specific storage area network devices in accordance with a common storage management protocol;

receiving by the systems manager, storage area network device information for a storage area network device to be managed by the systems manager;

in response to the received storage area network device information, the systems manager automatically determining if an installed provider module is suitable for the storage area network device to be managed by the systems manager;

in response to a determination by the systems manager that an installed provider module is suitable for the storage area network device to be managed by the systems manager, the systems manager identifying the provider module determined to be suitable for the storage area network device to be managed by the systems manager; and in response to a determination by the systems manager that an installed provider module is not suitable for the storage area network device to be managed by the systems manager, the systems manager automatically installing in a provider server an additional provider module that is suitable for the storage area network device to be managed by the systems manager.

14. The computer program product of claim 13 wherein the operations further comprise:

in response to an identification by the systems manager that an installed provider module is suitable for the storage area network device to be managed by the systems manager, the systems manager automatically configuring the identified installed provider module for managing the storage area network device to be managed by the systems manager; and in response to installation by the systems manager of an additional provider module that is suitable for the storage area network device to be managed by the systems manager, the systems manager automatically configuring the installed additional provider module for managing the storage area network device to be managed by the systems manager.

15. The computer program product of claim 14 wherein the operations further comprise:

in response to the systems manager installing and configuring the additional provider module that is suitable for the storage area network device to be managed by the systems manager, the systems manager automatically discovering the installed and configured additional provider module for the storage area network device to be managed by the systems manager.

16. The computer program product of claim 14 wherein the systems manager installing an additional provider module that is suitable for the storage area network device to be managed by the systems manager, further includes the systems manager automatically determining if a deployed virtual server of a provider server is suitable for hosting installation of the additional provider module; and in response to a determination that a deployed virtual server of a provider server is suitable for hosting installation of the additional provider module, the systems manager automatically identifying the deployed virtual server determined to be suitable for hosting installation of the additional provider module, and automatically installing the additional provider module on the deployed virtual server identified as being suitable for installing the additional provider module.

17. The computer program product of claim 14 wherein the systems manager installing an additional provider module that is suitable for the storage area network device to be managed by the systems manager, further includes the systems manager automatically determining if a deployed virtual server of a provider server is suitable for hosting installation of the additional provider module; and in response to a determination that a deployed virtual server of a provider server is not suitable for hosting installation of the additional provider module, the systems manager automatically deploying an additional virtual server which is suitable for hosting installation of the additional provider module, and installing the additional provider module on the deployed additional virtual which is suitable for hosting installation of the additional provider module.

18. The computer program product of claim 13, wherein the systems manager determining if an installed provider module is suitable for the storage area network device to be managed by the systems manager, further includes:
   automatically determining if an installed provider module supports the storage area network device to be managed by the systems manager; and
   in response to a determination that a particular installed provider supports the storage area network device to be managed by the systems manager, the systems manager further:
   automatically determining the limit of storage area network devices that can be managed by the particular installed provider;
   automatically determining the current number of storage area network devices being managed by the particular installed provider;
   automatically determining if the determined current number of storage area network devices that can be managed by the particular installed provider is less than the determined limit of storage area network devices that can be managed by the particular installed provider; and
   in response to a determination that the determined current number of storage area network devices that can be managed by the particular installed provider is less than the determined limit of storage area network devices that can be managed by the particular installed provider, automatically determining that the particular installed provider module is suitable for the storage area network device to be managed by the systems manager.

19. The computer program product of claim 16 wherein the systems manager determining if a deployed virtual server of a provider server is suitable for hosting installation of the additional provider module further comprises automatically comparing predetermined virtual server resource requirements for the additional provider module to available resources of available deployed virtual servers, and automatically determining a suitable deployed virtual server of for hosting installation of the additional provider module.

20. The computer program product of claim 19 wherein the predetermined virtual server resource requirements for the additional provider module include at least one of disk storage space, memory space and processor resources.

21. The computer program product of claim 17 wherein the systems manager deploying an additional virtual server which is suitable for hosting installation of the additional provider module, includes automatically deploying a virtual server which at least meets the predetermined virtual server resource requirements for the additional provider module.

22. The computer program product of claim 13 wherein the receiving by the systems manager, storage area network device information for a storage area network device to be managed by the systems manager, includes receiving model type information for the storage area network device to be managed by the systems manager, and wherein the systems manager automatically determining if an installed provider module is suitable for the storage area network device to be managed by the systems manager, includes the systems manager automatically determining if an installed provider module is suitable for the storage area network device to be managed by the systems manager as a function of the received model type information.

23. The computer program product of claim 17 wherein the systems manager automatically determining if a deployed virtual server of a provider server is suitable for hosting installation of the additional provider module, includes the systems manager automatically determining if a deployed virtual server of a provider server is suitable for hosting installation of the additional provider module as a function of known software conflicts.

24. The computer program product of claim 17 wherein the systems manager automatically determining if a deployed virtual server of a provider server is suitable for hosting installation of the additional provider module, includes the systems manager collecting information concerning the provider module requirements and the resources of the available virtual servers and automatically comparing data pairs of a provider modules requirement to identify a suitable virtual server to host the provider module.

* * * * *